United States Patent [19]
Kalb et al.

[11] 3,982,101
[45] Sept. 21, 1976

[54] LASER VELOCIMETER REAL TIME DIGITAL DATA ANALYZER

[75] Inventors: Henry T. Kalb, Manchester; Virgil A. Cline, Jr.; Bruce W. Bomar, both of Tullahoma, all of Tenn.

[73] Assignee: The United States of America as represented by the Secretary of the Air Force, Washington, D.C.

[22] Filed: May 19, 1975

[21] Appl. No.: 578,845

[52] U.S. Cl............................. 235/152; 324/77 R; 73/194 E
[51] Int. Cl.² ........................................ G06F 15/30
[58] Field of Search ......... 73/194 E; 324/183, 77 R, 324/77 A; 340/172.5, 324 R, 324 A, 324 AD; 235/152

[56] References Cited
UNITED STATES PATENTS

| | | | |
|---|---|---|---|
| 3,406,387 | 10/1968 | Werme | 340/324 A |
| 3,686,662 | 8/1972 | Blixt | 340/324 AD |
| 3,786,476 | 1/1974 | Graves | 340/324 A |
| 3,818,475 | 6/1974 | Hussey | 340/324 A |

Primary Examiner—Charles D. Miller
Attorney, Agent, or Firm—Joseph E. Rusz; Julian L. Siegel

[57] ABSTRACT

A digital analyzer for a laser velocimeter which compresses data into groups for a histogram display. A data processor containing the velocimeter information is fed through a multiplexer to a memory which is controlled by a data interrupt circuit that is fed by a two-phase clock. One phase of the clock pulses an address counter which feeds the multiplexer and a first digital-to-analog converter that controls the x-drive of a cathode ray tube. The data processor also has an output fed to a full adder and then fed back to the memory with the same output being fed to a storage register followed by a second digital-to-analog converter that controls the y-drive of the cathode ray tube.

3 Claims, 10 Drawing Figures

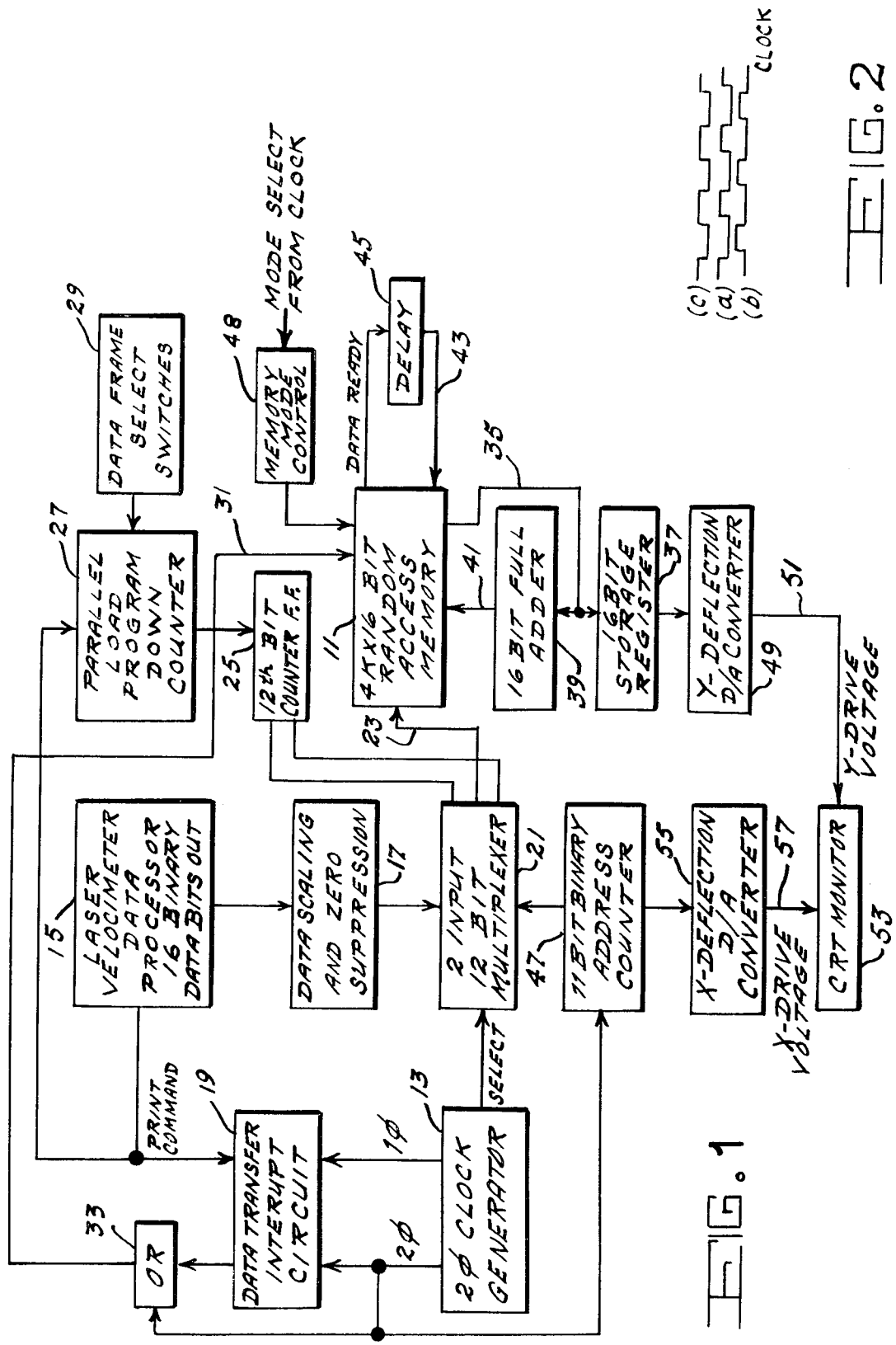

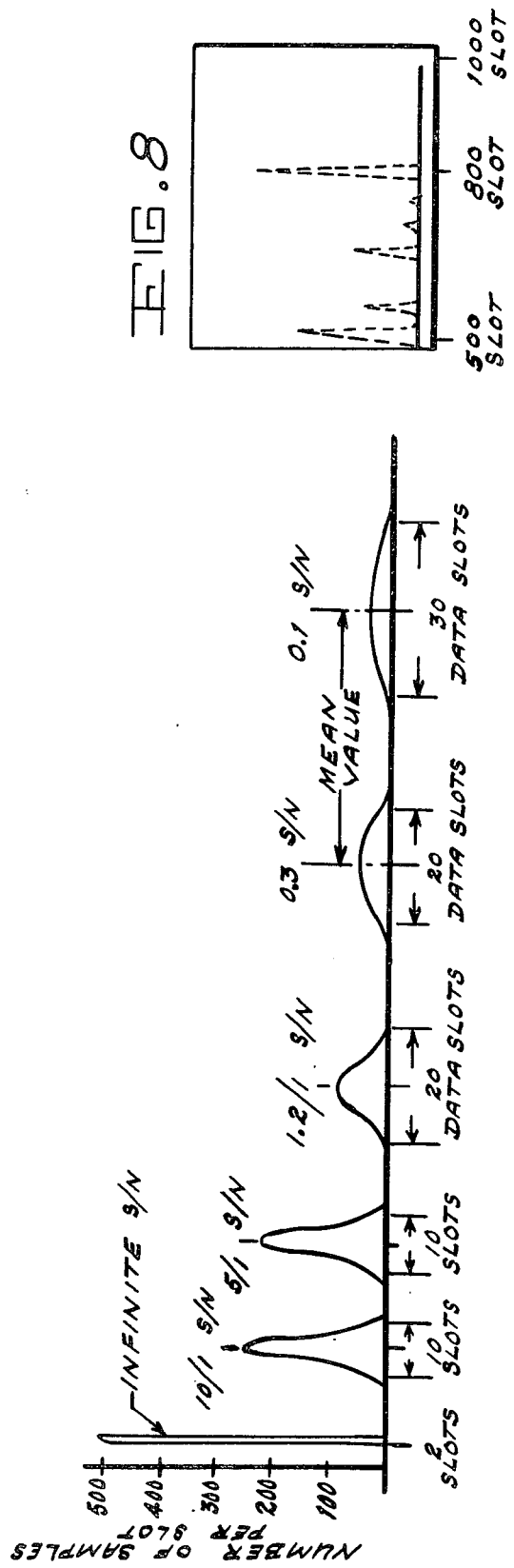
FIG.8
FIG.6
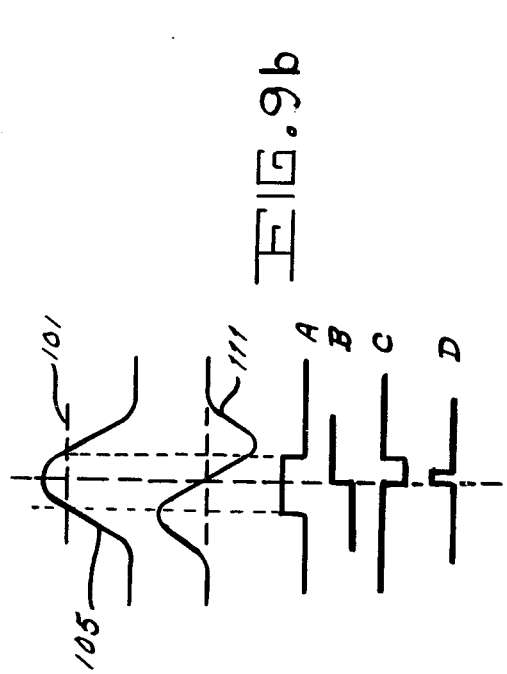
FIG.9b
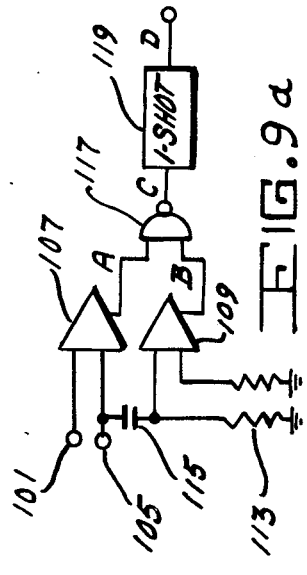
FIG.9a 3,982,101

LASER VELOCIMETER REAL TIME DIGITAL DATA ANALYZER

STATEMENT OF GOVERNMENT INTEREST

The invention described herein may be manufactured and used by or for the Government for governmental purposes without the payment of any royalty thereon.

BACKGROUND OF THE INVENTION

This invention relates to data processing systems, and more particularly to a real time digital data analyzer for display and compression of laser velocimeter derived frequency burst signal data.

The application of the laser velocimeter as a nonperturbing fluid-flow velocity measuring tool has been discussed in the literature. It has been shown that two mutually coherent and like polarized laser beams when crossed, establish planar interference fringes in the crossover region. Light scattering centers passing through the crossbeam region provide frequency burst type signals when viewed by a photodetecting device. These frequency burst signals may be digitized and can provide data sampling rates that may exceed 100,000 samples per second. Data typically exists in 16 bit binary or 20 bit BCD word form. Existing digital data acquisition systems are presently limited to a nominal 10,000 word continuous acquisition rate. The present invention permits a 10 to 1 increase in the word acquisition rate and provides data compression and an on-line visual display of the acquired data in histogram form. The grouped data may subsequently be processed to yield such statistical quantities as the mean, standard deviation, mode, skewness, kurtosis and maximum-minimum values of the data.

SUMMARY OF THE INVENTION

The present invention is a system for on line processing of laser velocimeter derived data. Data compression is exercised upon the random (time) occurring data by grouping into a frequency distribution or histogram, for further statistical evaluation. Data acquisition rates can thus be realized which are beyond the capability of existing digital data acquisition systems. The on line generated histogram provides for a means of eliminating random noise generated errors from the arrayed data and provides for visual analysis of the grouped data.

It is therefore an object to provide an on line analyzer of laser velocimeter data in real time.

It is another object to provide a laser velocimeter analyzer that eliminates random noise generated errors.

It is still another object to provide a laser velocimeter processor that provides for visual analysis of data grouped into a histogram.

It is yet another object to provide a laser velocimeter that offers a 10 to 1 increase in word acquisition.

These and other objects, features and advantages of the invention will become more apparent from the following description taken in connection with the illustrative embodiment in the accompanying drawings.

DESCRIPTION OF THE DRAWINGS

FIG. 1 is an embodiment of the multichannel digital analyzer data compression and display system;

FIG. 2 consists of waveform diagrams useful in the explanation of FIG. 1;

FIG. 6 is a graph showing the frequency distribution of the data processor samples;

FIG. 8 is a graph of the processor's data distribution with an 0.05 S/N power ratio; and FIG. 9a is a circuit diagram for peak detecting the display shown in FIG. 8; and FIG. 9b are waveform diagrams useful in the explanation of FIG. 9a.

DETAILED DESCRIPTION OF THE PREFERRED EMBODIMENT

Figure 4:
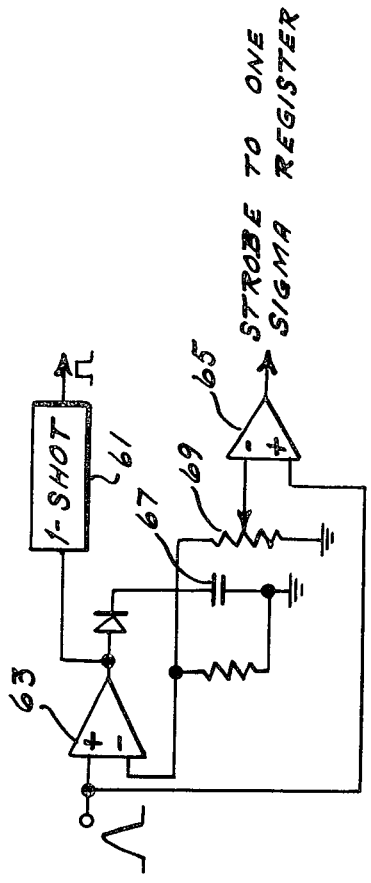
FIG. 4 shows a schematic diagram of an analog peak detector for analysis of the histograms obtained from the embodiment of FIG. 1.

The on-line data multichannel digital analyzer is shown in FIG. 1. A 4K word by 16 bit core memory 11 is used where the memory is partitioned into two 2,000 word sections. The sectioning of memory 11 permits the inputting of data into one section while grouped data display and data extraction is practiced upon the remaining section. Memory 11 has a 750 nanosecond cycle time and data could be written into and read out within this interval. Two-phase clock 13 running at 200 KHz (5 microsecond interval) is used to cycle memory 11. The $1\phi$ and $2\phi$ outputs of clock 13 are shown in FIG. 2 as waveforms (a) and (b) respectively. This permits the continuous acquisition of data at a 100K word rate. The velocimetry data is taken from laser velocimeter data processor 15 (in the form of a 16 binary bit word) scaled by data scaling circuit 17 when required, to 11 bits (one part in 2,000 resolution) to fit within the memory 2,000 data slot configuration. It is noted that in the general case a larger memory would permit a proportionate increase in data resolution.

For data acquisition the random time occurring data from processor 15 (temporarily register stored within the processor) is accompanied by a processor generated print command (PC) when the data is ready for transfer. The PC sets a flip-flop (not shown) within data transfer interrupt circuit 19.

Interrupt circuit 19 synchronizes the data transfer during the next one phase ($1\phi$) from two-phase clock 13 and provides a short hold-off release pulse to processor 15 to permit further data sampling. Data processor 15 register is parallel wired to multiplexer 21 which is enabled to pass processor register data to the 12 bit memory address lines 23 during each $1\phi$ clock, 5 microsecond interval. Multiplexer 21 is enabled by clock 13 with the waveforms as shown in FIG. 2, waveforms (c). The multiplexer's twelfth bit controls the 0 to 2,000, 2,000 to 4,000 word partition of the memory by alternately applying a 1/0 logic state to the twelfth (12th) address bit of the memory as the $1\phi$, $2\phi$ clock pulses occur. The input logic state to the multiplexer 12th bit originates from flip-flop 25 which is cycled once for each frame of data taken. A data frame is defined to be a preselected number of data samples under the control of down counter 27 which is loaded by binary program switches 29 to accept from 64 to 65,536 data samples per frame. Down counter 27 counts each print command from the processor 15 and decrements preloaded counter 27 contents by one. When the zero content terminal count is reached, counter 27 reloads itself to the original data sample number and toggles the memory 12th address bit flip-flop 25. Memory 11 now reverses its data store/data read partitioning and starts to display the histogram of the data frame just acquired. Processor 15 input data, as prior indicated, appears at the memory address lines 23 each 1$\phi$ clock pulse. Memory 11, however, will not read this data unless data transfer interrupt circuit 19 issues a memory cycle initiate pulse 31 through OR gate 33 in response to a processor print command. When these conditions are met, pulse 31 causes the memory control circuitry to select the 16 bit data word that corresponds to memory address input 23. This word appears at data out terminals 35 of memory 11 and is directed to storage register 37 and 16 bit full adder 39.

Register 37, unless strobed, will not accept data 35 and is intended for the readout portion of the cycle (to be described). Adder 39, however, is wired to add "one" to the data word from memory. The data word plus one then appears at the data in terminals 41 of memory 11. A nominal 500 nanoseconds is allowed for the carry of adder 39 to stabilize, then a cycle continue pulse 43 is issued by dual one-shot delay circuit 45. Core memory 11 can be programmed through two memory mode controls 48 to perform the following cycles: A, Read/Restore; Clear/Write; C, Read/Pause/Write; and D, Clear/Pause/Write. The A/B/C modes are used for data compression, the A/B modes are used in the data readout cycle to be described, and the C mode during the data acquisition cycle presently being described. This Read/Pause/Write mode is termed a split cycle mode, where the cycle initiate pulse 31 causes memory 11 to read out the word contents being addressed; then memory 11 waits to receive a cycle continue pulse 43 to write the word back into memory 11. In the data acquisition cycle, each time a specific word in memory 11 is addressed, the word content is incremented by one count. The result is that memory 11 sorts the incoming processor 15 data into appropriate slots, from the two thousand slots available, and totalizes in each slot the number of times that a specific reading from processor 15 occurred during the data frame. For clarity it is stated that each memory slot (or word location) is reserved for one (and only one) data number issued by processor 15 over a given velocity range. Memory 11 is well adapted to this type of sorting operation and can continuously sort data at the rate of 100,000 samples per second. Each slot in memory 11 can totalize to in excess of 65,000 data reading occurrences before overflow occurs. The sorted data can now be displayed as discussed in the section following.

At the end of a data frame, the section in memory 11 taking data and the section reading data reverse their roles via the address 12th bit control 25 in relation to the 2$\phi$ clock. At the instant that a data frame is complete and the memory partition reversal takes place, the portion of memory 11 preparing to take data is cleared in prior data, i.e., all slots reset to read zero contents.

The memory portion containing the last data frame is now read out. The read cycle is accomplished by the 2$\phi$ clock 19 driving 11 bit binary memory address counter 47 that increments its output by one for each 2$\phi$ clock pulse. When the phase 2 waveform is high multiplexer 21 applies the binary counter number to memory address lines 23 and sequentially addresses each one of the 2,000 word slots. Each time a slot is addressed, the word contents are read out and then written back into memory A unchanged. While the word is at the data out terminals 35, data storage registers 37 are strobed permitting storage of that word until the next strobe pulse occurs ten microseconds later. Register 37 in turn applies its contents to a digital-to-analog (D/A) converter 49 which outputs an analog voltage 51 proportional to the word magnitude. This analog voltage 51 is applied to the Y-deflection drive of cathode ray tube monitor 53.

Memory address counter 47 concurrently addresses a second digital-to-analog converter 55 which outputs an X drive analog voltage 57 to CRT monitor 53. Monitor 53 provides a histogram display of the memory stored data where the processor velocity data lies along the X-axis and the number of occurrences at each velocity point is recorded along the Y-axis. Memory address counter 47 requires 20 milliseconds to complete a 2,000 word scan or will perform 50 memory scans per second. This provides for a flicker-free CRT display. A bistable storage CRT monitor could be employed with only a single memory scan required.

Figure 3:
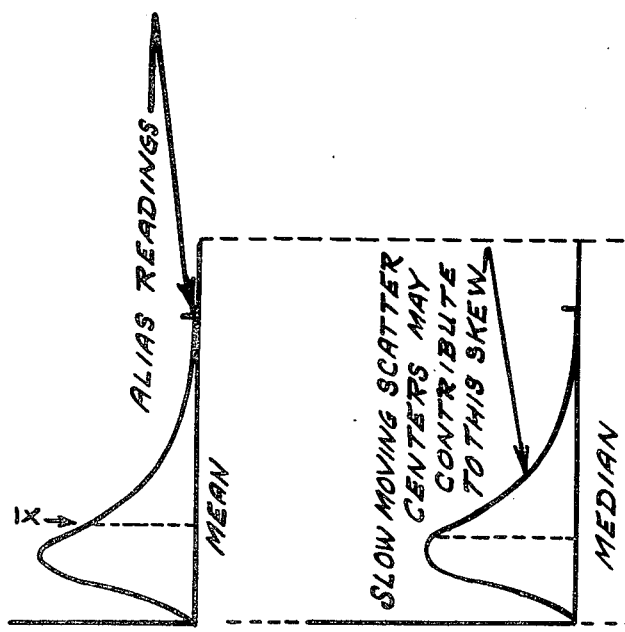
FIG. 3 is an example of a histogram display obtained from the embodiment of FIG. 1.

The histogram provides a quick look at the data distribution and is useful for detecting skewness or other departures from a symmetrical form. The display is a sensitive indicator of data acquisition abnormalities produced by optical misalignment or poor signal-to-noise ratio burst data. The presence of two serious error mechanisms can be predicted from the histogram. Slow moving scatter centers that lag the mean flow velocity and produce lower frequency burst signals can skew the data. Alias number recordings that differ widely (but predictably) from the true value can appear in noisy signal areas. Alias (false) numbers can occur at 25, 50, 37, 62, 75, and 100 percent of true reading. For turbulent velocity variations of 10 to 20 percent it is not difficult to detect the presence of these error sources from the histogram display. FIG. 3 shows the arithmetic mean, the median, and the mode of a frequency distribution skewed to the right. The inclusion of these error sources into the data reduction process has a pronounced effect upon the computed arithmetic mean but would effect the median less and the mode least of all. For skewed data, the mode may be a more accurate indicator of the true mean velocity. To determine the mode of ungrouped data, it is desirable (if not necessary) to group the data into a frequency distribution or histogram rather than attempt calculation. Since memory 11 has already achieved this, it becomes a relatively simple matter to detect the peak value of the histogram. This can be done by either analog or digital peak detectors. An analog peak detector is shown in FIG. 4 which can be used to monitor the Y-deflection voltage on the CRT monitor such that when the peak occurs the detector will strobe from one-shot multivibrator 61 a data register parallel wired to the 11 bit binary address counter 47 (FIG. 1). The histogram data is fed to differential voltage comparators 63 and 65. Capacitor 67 is used for peak storage. Counter 47 (FIG. 2) at this time contains the velocity peak value in digital form. The register provides temporary storage for the peak value and can further be employed in obtaining a close approximation of the data standard deviation ($\sigma$). If the data distribution were normal, or Gaussian, the peak value (mode) just determined would correspond to the mean as well. The ordinates along a normal curve are well-known in relation to the mean and the standard deviation. For example, the ordinate displaced ± 1$\sigma$ from the mean is given as 60.6 percent of the mean amplitude. At ± 2$\sigma$ the ordinate is 13.5 percent of the mean amplitude. For moderately skewed data, a reasonable approximation of $\sigma$ can be determined. An analog coefficient detecting circuit is inputted with the analog peak detector output from the previous memory scan. Coefficient port 69 is set at 60.6 percent of its maximum value and this voltage is inputted into one port of voltage comparator 65. During the next 20 millisecond memory scan voltage comparator 65 monitors the CRT/Y deflection voltage through its second input port. As the Y voltage passes the 60.6 percent of peak value comparator 65 will output a logic level change which permits register storage of the contents of the X-drive binary address counter 47. A similar action takes place as comparator 65 monitors the descending portion of the data distribution. The value of sigma obtained from the three readings gives a measure of the data dispersion. If the curve were nearly normal it is seen that by symmetry only two readings need be taken. This can be used to advantage by providing a means of determining both the mean and standard deviation of a data set during only one memory scan. The analog peak detector is used to locate the data mean, then the analog peak value is applied to the 60.6 percent of peak detecting circuit 69. This circuit now determines the point of occurrence of one sigma during the residual portion of the memory scan cycles as the data distribution declines.

Figure 5:
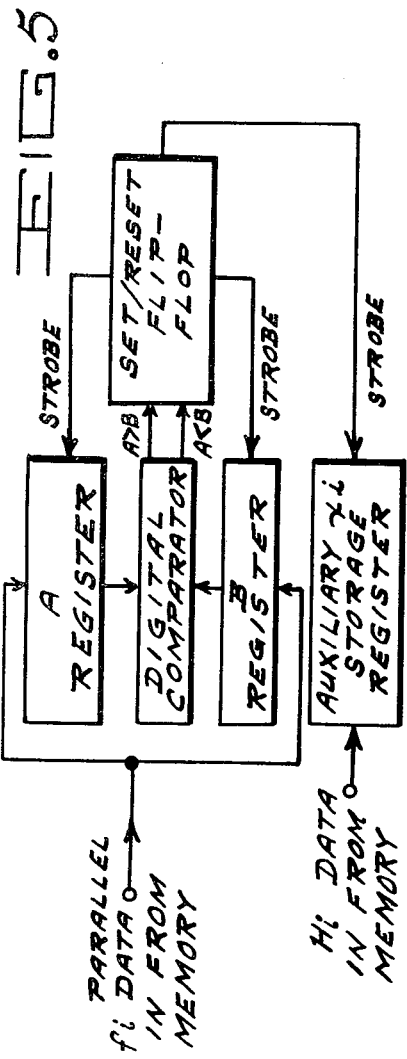
FIG. 5 is a schematic diagram showing a digital peak detector for analysis of the histograms obtained from the embodiment of FIG. 1.

It is noted that digital techniques of FIG. 5 using exclusive-OR gates or digital comparators may similarly be used to detect the mean and standard deviation. These techniques offer increased detection accuracy at the expense of increased complexity. The histogram display provides a convenient means of integrating the area under the data curve through the sum of products of the individual X/Y values read from memory.

Assume that a continuous input data rate of 100,000 samples per second were applied by the processor to the memory. If a single readout scan required 20 milliseconds for the 2,000 word location coverage, it would also require that the input data frame contain not less than 2,000 samples.

Should the velocity data change appreciably during the scan interval, it may become desirable to use a smaller data frame and a shorter scan cycle. For 25 percent velocity turbulence levels the majority of the grouped data would lie within 500 of the 2,000 slots and a scan reduction time of 4 to 1 could be gained if only those slots were scanned. This means can be implemented by the use of parallel load/programmable counters, typically the TTL 74193 and an auxiliary comparator limit detector. These counters are up/down types such that the direction of memory scan can be reversed if desired. The upper and lower limits of the memory address counter scan 47 (FIG. 1) may now be controlled by manual data entry switches. The switches could alternately be replaced by circuitry such that the data peak value controls the scan counter limits, which then change to maintain an approximate constant slot range as the data mean changes.

Additional reduction in scan time could be gained by employing a faster scan clock. The memory of FIG. 2 possesses a cycle time such that it can read/write data at a 1 MHz rate; thus, it could read a data sample in during 1 microsecond and read out the multiplexed scanned data during the next microsecond. This could provide for a 5 to 1 reduction in scan time over the previous clock. The combined 20 to 1 reduction in scan time would permit the 500 slots to be scanned in one millisecond while a 100 sample new data frame was concurrently being acquired.

If the velocity data corresponding to the histogram peak and the one standard deviation ordinate were all that were required of the data group, then a data compression ranging from 50/1 to 1,000/1 has been achieved in the two examples given. Proportionately larger compression ratios are possible with larger data frames.

Laser velocimeter derived data can be seriously perturbed by noise in marginal signal regions, as shown in FIG. 6. These sampled bursts are subject to noise induced random errors where the maximum-minimum values may deviate 3 percent from the mean. Tests have shown that such data when averaged can approach within 0.02 percent of the true value. The data extraction technique described would provide for this averaging of random errors as well as provide a means of elimination of alias reading errors.

Figure 7:
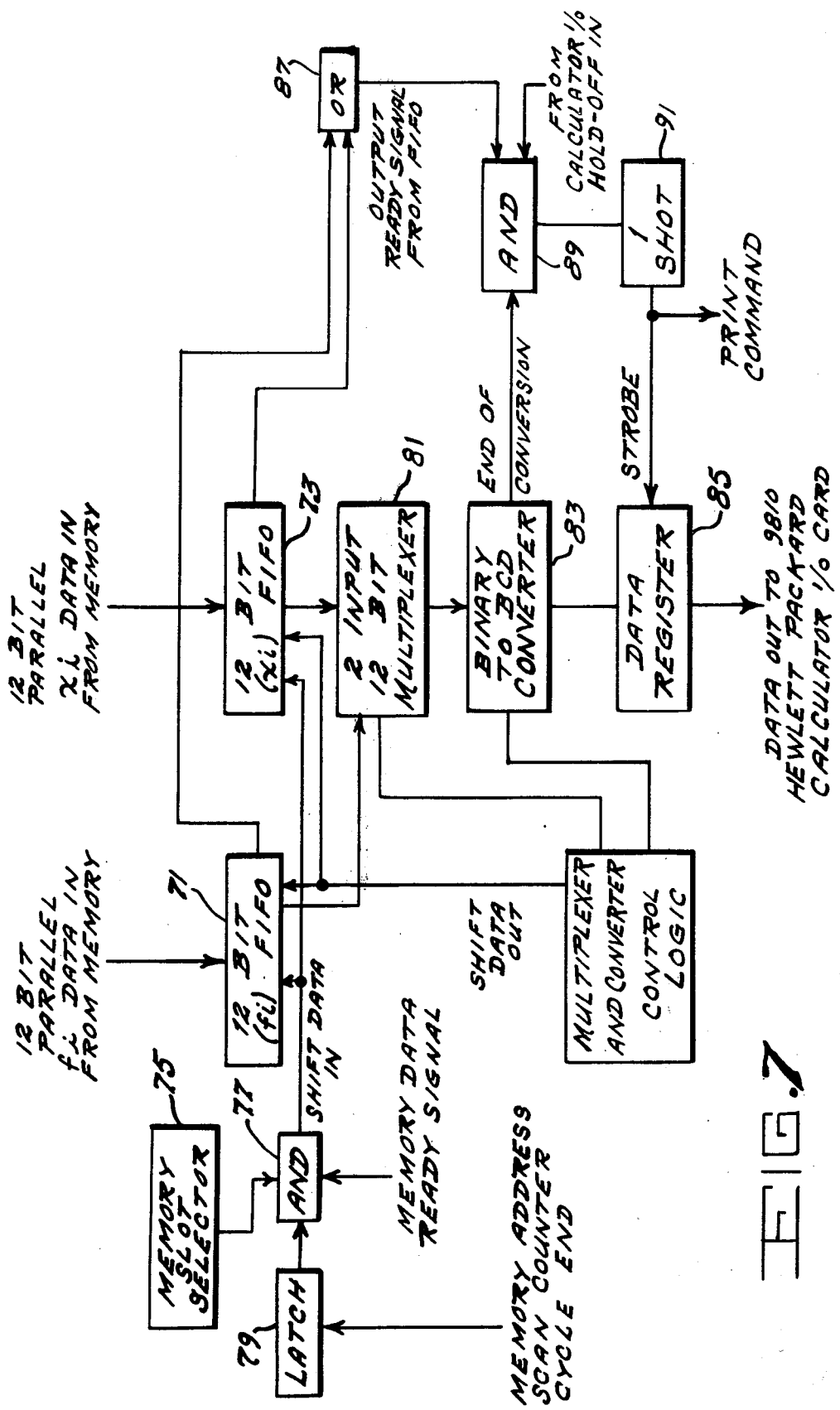
FIG. 7 is a schematic diagram showing a circuit for extracting stored histogram data to produce a hand copy record.

In some events it is desirable to extract the memory stored histogram data for a hand copy record, which can be achieved with the circuit shown in FIG. 7. Two 12 bit first-in/first-out (FIFO) buffer memories 71 and 73 are used to store the transferred data in bit parallel, word serial form. The FIFO's 71 and 73 are designed to store data in 64 word blocks. Magnitude detector 75 is preset to detect data slots containing the number of data occurrence greater than a preselected number. Detector 75 is fed to AND gate 77 as is a data ready signal and a signal from latch circuit 79. During a single memory data scan the FIFO's 71 and 73 are directed by detector 75 to store the x-axis velocity data word ($xi$) and the y-axis (frequency of occurrences ($fi$)) simultaneously as related data sets. The FIFO's 71 and 73 may read data in at a MHz rate and maintain the data set relation. The data sets are subsequently transferred via multiplexer 81, bit converter 83, and data register 85 to a Hewlett Packard 9810 programmable calculator through a data 1/0 card. FIFO's 73 and 75 are fed to OR gate 87 and AND gate 89 followed by one-shot 91 for generating a strobe and print command. The calculator possesses software programming capability for resolving such statistical quantities as mean, standard deviation, skewness, and kurtosis from the data sets. The calculator further may interface with an X–Y plotter for hand copy reproduction of the histogram distribution. An attached cassette magnetic tape recorder may also be used for permanent storage of the data set while the calculator thermal printer is used to provide a print out of the statistical quantities evaluated. The calculator thus serves to provide for on-line periodic detailed evaluation of the $x_i, f_i$ data sets being generated by the velocimeter without affecting the data acquisition rate of the memory.

In those velocimeter installations where flow directionality is of interest, a two-component system is required. The simultaneous capture of frequency burst data from both the X and Y components of flow permit the determination of a larger range of flow parameters than the one component data. In the simple case, the velocity vector resolution and the flow angularity data treatment is described.

Assume that the velocimeter reference frame is orthogonal and that the resultant velocity ($V_R$) can be determined from the relation $$V_R = \sqrt{V_x^2 + V_y^2}$$

with the flow angularity tangent obtainable from the ratio, $V_Y/V_x$. It is practical to convert the $V_x$ and $V_y$ values to analog form and employ standard analog operator function modules to accomplish the data reduction with some loss in accuracy and a slowing of the data rate to nominally 10,000 samples per second. Multiple modules operating upon the two data channels in parallel is implied to speed the data flow.

Data operation can be performed digitally with several options available. The trade off lies in the speed of data flow versus the flexibility of software controlled processing, high speed operation means, parallel operations, high current demands, and increased complexity of in-house circuit buildup. In this area, the TTL family arithmetic logic units (typically 74181) with auxiliary shift registers, in-out data gating and operational control logic, can perform the multiplication of two twelve bit words in from 0.5 to 1.5 microseconds. If dedicated logic blocks are assigned to do one specific job repeatedly and pass the data along to a subsequent block, it is possible to resolve the vector velocity within 10 microseconds and thus maintain a 100 K/second potential data flow. Assume that a relaxed data flow is accepted, then, the central processing units from the LS1/MOS micro-computers make a likely choice. These devices (typically Fairchild 3800 or National MM5750) contain the adders, shift registers and control within a single (or a few packages). The current demand (and heat buildup) is considerably less than the first case but the speed is down. Typically 100 – 200 microseconds would be required to resolve the vector $V_R$. In the third case, the micro-processor, such as the National 1MP-16C (a 16 parallel bit computer on a single printed circuit card), could be used to serial process the data at a further loss in speed. This approach offers the advantage of software control over the data reduction and permits easy modification to the data processing. The fourth case can employ the Hewlett Packard 9810 calculator under software control. This device can only accept data at a maximum rate of 40 samples per second but is particularly suited to vector arithmetic operations and is simple and quick to program. A fifth case is to store the unresolved data on magnetic tape and subsequently process at a central computer facility.

The on-line resolved data may now usefully be applied to core memory 11 (FIG. 1) for symmetry of histogram display, mean velocity, and direction of flow resolution. Many of the potential error mechanisms (random noise data spread, etc.) remain with the two-component data as existed with the single component data.

FIG. 8 illutrates the data distribution taken from a processor sampling, a 0.05 S/N source. The true reading resides at the peak of the taller data group to the right. The lower amplitude data groups to the left are alias (or false readings) who's inclusion in the transferred data would be undesirable. These groups peak at −18, −31, and −37 percent, respectively, of the true data value, and represent some 40 percent of a total 4,000 samples recorded. If the total body of data were processed for an average value the resultant mean would be in error from the true data value by −13 percent. Data inspection, with an estimate at the time of processing, would permit the arrival at a more realistic mean value. Interim time, equipment and manpower, however, have been used in the transfer and handling of a great amount of useless data. Peak detecting the display in FIG. 8 would permit the extraction of a single data point accurate to within 0.2 percent of the true data value and the instant discard of the remaining 3,999 pieces of information. A peak detector particularly suited to this task is shown in FIG. 9a and the accompanying waveform diagrams, FIG. 9b. A precision adjustable V threshold voltage 101 is selected along the ordinate scale to reside somewhere between peak 103 to be selected and the next lower peak. The detector is inhibited from operation until an input data group whose peak 103 exceeds V threshold 101 is applied to input distribution port 105 of the dual differential comparators 107 and 109. The inhibit clamp imposed by comparator 107 is now removed and comparator 109 now functions as a zero crossing detector upon the derivative 111 of the input data group. Derivative 111 obtained from the RC combination of resistor 113 and capacitor 115 passes through zero as the slope of input distribution 105, and goes to zero at the peak value. NAND gate 117 inputted with a "1—1" logic level, outputs a level change which triggers one-shot 119 at the time of peak occurrence. One-shot 119 in turn enables a storage register to store the $X_1$ value corresponding to the maximum $F_1$. D represents the register strobe.

What is claimed is:
1. A digital analyzer for a velocimeter data processor comprising:
    a. a clock having first and second phase outputs;
    b. a data interrupt circuit fed by the first and second phase outputs of the clock and activated by a command from the data processor;
    c. a multiplexer fed by the data processor;
    d. a random access memory fed by the multiplexer and initiated by the data interrupt circuit and having a readout terminal and a data-in terminal;
    e. a down counter fed by the command from the data processor;
    f. a flip-flop activated by the down counter, the output thereof being fed to the multiplexer;
    g. a full adder fed by the readout terminal of the random access memory and fed back thereto at the data-in terminal;
    h. an address counter driven by the second phase of the clock and activating the multiplexer;
    i. a cathode ray tube having an x-deflection terminal and a y-deflection terminal;
    j. a first digital-to-analog converter fed by the random access memory and connected to the y-deflection terminal of the cathode ray tube; and
    k. a second digital-to-analog converter fed by the address counter and connected to the x-deflection terminal of the cathode ray tube.

2. A digital analyzer for a velocimeter data processor according to claim 1 which further comprises a data scaling circuit interposed between the data processor and the multiplexer.

3. A digital analyzer for a velocimeter data processor according to claim 2 which further comprises a storage register interposed between the full adder and the first digital-to-analog converter.

* * * * *